(12) United States Patent
Sethuraman et al.

(10) Patent No.: US 10,275,853 B2
(45) Date of Patent: Apr. 30, 2019

(54) MEDIA HUB DEVICE AND CACHE

(71) Applicant: Intel Corporation, Santa Clara, CA (US)

(72) Inventors: Ramanathan Sethuraman, Bangalore (IN); Arojit Roychowdhury, Bangalore (IN); Ajaya V. Durg, Austin, TX (US); Rajeev D. Muralidhar, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/687,001

(22) Filed: Apr. 15, 2015

(65) Prior Publication Data

US 2016/0307291 A1    Oct. 20, 2016

(51) Int. Cl.
  *G06T 1/20* (2006.01)
  *G06T 1/60* (2006.01)
(52) U.S. Cl.
  CPC . *G06T 1/60* (2013.01); *G06T 1/20* (2013.01)
(58) Field of Classification Search
  None
  See application file for complete search history.

(56) References Cited

U.S. PATENT DOCUMENTS

| | | | |
|---|---|---|---|
| 2003/0084244 A1 | 5/2003 | Paulraj | |
| 2006/0064546 A1 | 3/2006 | Arita et al. | |
| 2008/0256330 A1 | 10/2008 | Wang et al. | |
| 2011/0261885 A1 | 10/2011 | de Rivaz | |
| 2012/0166843 A1 | 6/2012 | Muralidhar et al. | |
| 2014/0137137 A1 | 5/2014 | Yan et al. | |
| 2014/0189332 A1 | 7/2014 | Ben-Kiki et al. | |
| 2015/0091920 A1* | 4/2015 | Rygh | G06T 1/20 345/522 |
| 2016/0103769 A1* | 4/2016 | Glickman | G06F 12/1081 711/6 |
| 2016/0246356 A1* | 8/2016 | Tiwari | G06F 1/3287 |

FOREIGN PATENT DOCUMENTS

JP    2012181860 A    9/2012

OTHER PUBLICATIONS

PCT International Search Report, PCT Application No. PCT/US2016/019867, dated Jul. 21, 2016, 3 pages.
Supplementary European Search Report, EP Application No. 16780417, dated Oct. 19, 2018, 7 pages.

* cited by examiner

*Primary Examiner* — YuJang Tswei
(74) *Attorney, Agent, or Firm* — International IP Law Group, P.L.L.C.

(57) ABSTRACT

The present disclosure describes techniques related to media caching. A media hub device may include a media hub device configured to execute an operation on a current frame of media having a frame period. The media hub device may include a cache configured to provide, to a media accelerator of the media hub device, data associated with the frame period of the current frame.

23 Claims, 6 Drawing Sheets

400

600

MEDIA HUB DEVICE AND CACHE

TECHNICAL FIELD

This disclosure relates generally to processing techniques of media. More specifically, the disclosure describes processing of media and media accelerators.

BACKGROUND

Media playback and capture are critical use cases impacting user experience and battery life of computing devices including mobile devices such as smartphones, tablets, multifunctional two-in-one computing devices, laptops, and the like. In some cases, systems have multiple media hardware accelerators accessing memory such as dynamic access memory (DRAM). Bandwidth needs increase significantly as media becomes increasingly data heavy in both content and display resolution.

BRIEF DESCRIPTION OF THE FIGURES

The following detailed description may be better understood by referencing the accompanying drawings, which contain specific examples of numerous objects and features of the disclosed subject matter.

DETAILED DESCRIPTION OF THE INVENTION

Figure 1:
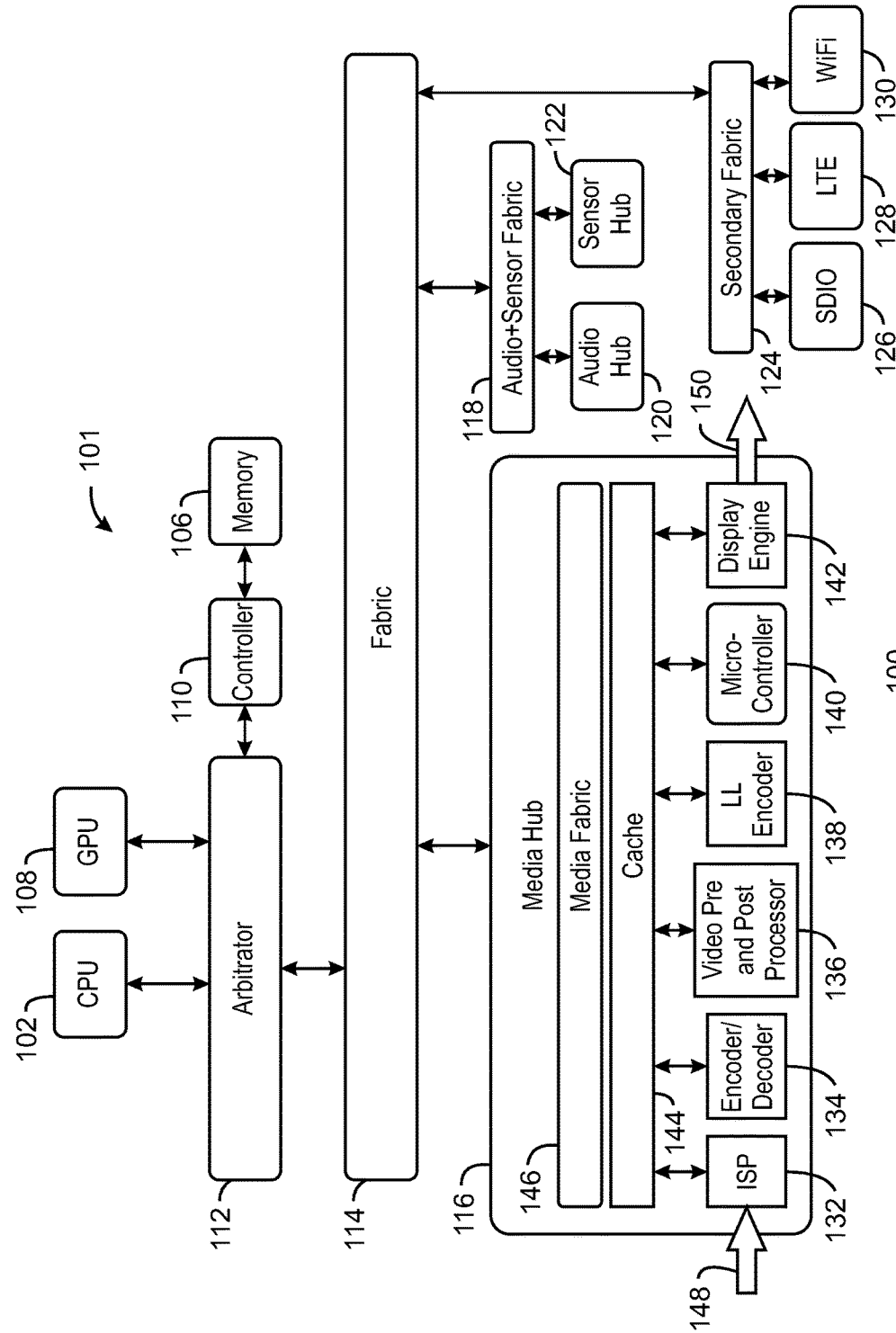
FIG. 1 is a block diagram illustrating an example computing system having a media hub.

As discussed above, computing systems may have multiple media hardware accelerators accessing memory such as dynamic access memory (DRAM). However, in some cases, media accelerators are not effectively connected together to achieve DRAM bandwidth reduction and power management across the SOC. In these cases, it may be challenging to design systems to support higher memory bandwidth, as well as effective power management, resulting in increased platform cost, as well as power, and thermal stress.

The techniques described herein include a media hub having a local cache to reduce bandwidth consumption related to media processing when fetched from a memory component servicing additional components of a computing system such as a central processing unit (CPU), a graphics processing unit (GPU), and the like. In the present disclosure media accelerators may be integrated into a media hub sub-system. As discussed in more detail below, a system having one or more media accelerators integrated into a media hub sub-system with a local cache memory supporting inter-media accelerator communication may reduce bandwidth and power consumption related DRAM accesses.

In addition to inter-media accelerator communication, the media hub sub-system may image data, such as stripe caching one or more reference frames for video encoding, video decoding, and the like. Stripe caching may also be performed at the media hub sub-system for previously processed frames for video post processing. The media hub sub-system may be referred to herein as a media hub or a media hub device interchangeably.

A media accelerator, as referred to herein, may include a processing unit having a function related to media processing. A media accelerator may include logic, at least partially including hardware logic, such as electronic circuitry. In some cases, a media accelerator may be implemented as hardware, software, firmware, or any combination thereof. In general, a media accelerator may be functional logic outside of a CPU or GPU. A media accelerator may be a fixed function accelerator a reconfigurable accelerator, or any combination thereof. For example, a media accelerator may include an encoder configured to encode media data captured for playback.

As discussed in more detail below, a media hub having local memory cache may enable functions of one or more other components of a computing system to be reduced, thereby reducing overall power consumption during media processing performed at the media hub. For example, while some known solutions may keep most of a system on chip (SOC) design and DRAM in an active state for media workloads (video playback, capture, and the like), the techniques described herein includes media accelerators integrated in a media hub with support for communication between media accelerators that are part of the media hub. In some case, the support for communication is provided through a media hub cache in addition to support for stripe caching reference frames and previously processed frames for video codecs and video preprocessors, post processors, or any combination thereof.

FIG. 1 is a block diagram illustrating an example computing system having a media hub. The example computing system 100 may include a computing device 101 may include a processor 102, and a memory device 106, a graphics processing unit (GPU) 108.

The memory device 106 may be a random access memory (RAM) device configured to provide data to a plurality of components of the computing device 100. The memory device 106 can include random access memory (RAM) (e.g., static random access memory (SRAM), dynamic random access memory (DRAM), zero capacitor RAM, Silicon-Oxide-Nitride-Oxide-Silicon SONOS, embedded DRAM, extended data out RAM, double data rate (DDR) RAM, resistive random access memory (RRAM), parameter random access memory (PRAM), etc.), flash memory, or any other suitable memory systems.

In some cases, the processor 102 is a CPU. The memory device 106 may be accessed by the GPU 108, the CPU 102, the storage device 104, as well as other components discussed in more detail below. In some cases, a memory controller 110 may interface between memory access requests to the memory component 106. In some cases, the memory controller 110 may be an integrated component of the memory device 106.

An arbitrator 112 may be any combination of hardware or software configured to arbitrate access to media including media access requests from various components including the CPU 102 and the GPU 108. A fabric 114 may be configured to communicatively couple a media hub device 116 to the memory device 106 via the arbitrator 112. Other components may include a fabric 118 configured to couple an audio hub 120 and other sensors of a sensor hub 112 to the fabric 114. The audio hub 120 may be configured to capture record and render audio associated with image data such as video. As discussed in more detail below, the fabric 118 may be used in an active state along with the media hub 116 in some circumstances while other components of the computing device 101 are in an inactive or less active state, thereby reducing power consumption. A secondary fabric 124 may couple the fabric 114 to components including a secure digital input/output (SDIO) device 116, various wireless communication devices and interfaces including Long-Term Evolution (LTE) 128, Wireless Fidelity (WiFi) 130, and the like.

As discussed above, the media hub 116 may include one or more media accelerators including an image signal processor (ISP) 132, a codec or encoder/decoder 134, a video pre and post processor 136, an encoder 138, a microcontroller 140, and a display engine 142. The illustration of media accelerators 132, 134, 136, 138, 140, and 142 in the media hub 116 is provided for example purposes only. Any combination of the one or more media accelerators 132, 134, 136, 138, 140, and 142, as well as other media accelerators may be included in the media hub 116.

The ISP 132 may be configured to receive image data during image capture indicated at 148. The encoder/decoder 134 may be configured to encode video data received from the ISP 132 during video record. The encoder/decoder 134 may also be configured to decode video data received from storage, such as the SDIO 126 during video playback. The video pre and post processor 136 may be configured to perform operations such as image enhancement, image scaling for format conversion, and the like. The low latency (LL) encoder 138 may be used in video playback, and in some cases for low latency wireless display encoding over wireless display. The microcontroller 140 may be a controller for the media hub 116 configured to perform audio pre and post processing, encoding and decoding, and the like, and may be platform dependent. The display engine 142 may be configured to perform operations related to image display such as setting frames for image display depending on a given display and the displays configurations and specifications, as indicated at 150. For example, the display engine 142 may be communicatively coupled to an internal display of the computing device 101, an external display communicatively coupled to the computing device 101, or any combination thereof.

In the embodiments described herein, one or more of the media accelerators 132, 134, 136, 138, 140, and 142 may be integrated within the media hub 116 enabling inter-communication between media accelerators without necessarily initiating operations of other components such as the GPU 108, the CPU 102, and the like. In some cases, one or more of the media accelerators 132, 134, 136, 138, 140, and 142 are directly connected to each other. In some cases, one or more of the media accelerators 132, 134, 136, 138, 140, and 142 are coupled via a compression component (not shown) to a cache 144 of the media hub 116.

In some cases, one or more of the media accelerators 132, 134, 136, 138, 140, and 142 are communicatively coupled via a cache 144, and, in some cases, via a media hub fabric 146. The cache 144 may be considered a second level cache (L2). A first level cache (L1) (not shown) may be integrated with each of one or more of the media accelerators 132, 134, 136, 138, 140, and 142. The cache 144 may be referred to herein as a Media Hub L2 cache (ML2) 144. The ML2 cache 144 may be local to the media hub 116. As discussed in more detail below, the ML2 cache 144 may enable at least some image processing operations associated with the one or more of the media accelerators 132, 134, 136, 138, 140, and 142 to be performed without access to the memory device 106. Integrating the ML2 cache 144 within the media hub 116 may enable a reduction of bandwidth consumption that may otherwise occur by memory accesses by one or more of the media accelerators 132, 134, 136, 138, 140, and 142.

In some cases, data stored in the ML2 cache 144 may include data related to a current frame for a given image. In the case of video, or a plurality of images combined in a video playback or capture, the ML2 cache may be configured to store data associated with a current frame of media having a frame period. The ML2 cache 144 may be configured to provide to one or more of the media accelerators 132, 134, 136, 138, 140, and 142 data associated with the frame period of the current frame. Further, in some cases discussed in more detail below, other components, such as the GPU 108, the CPU 102, and the like, may enter a less active state during the media hub 116 operations resulting in relatively lower power consumption.

Figure 2:
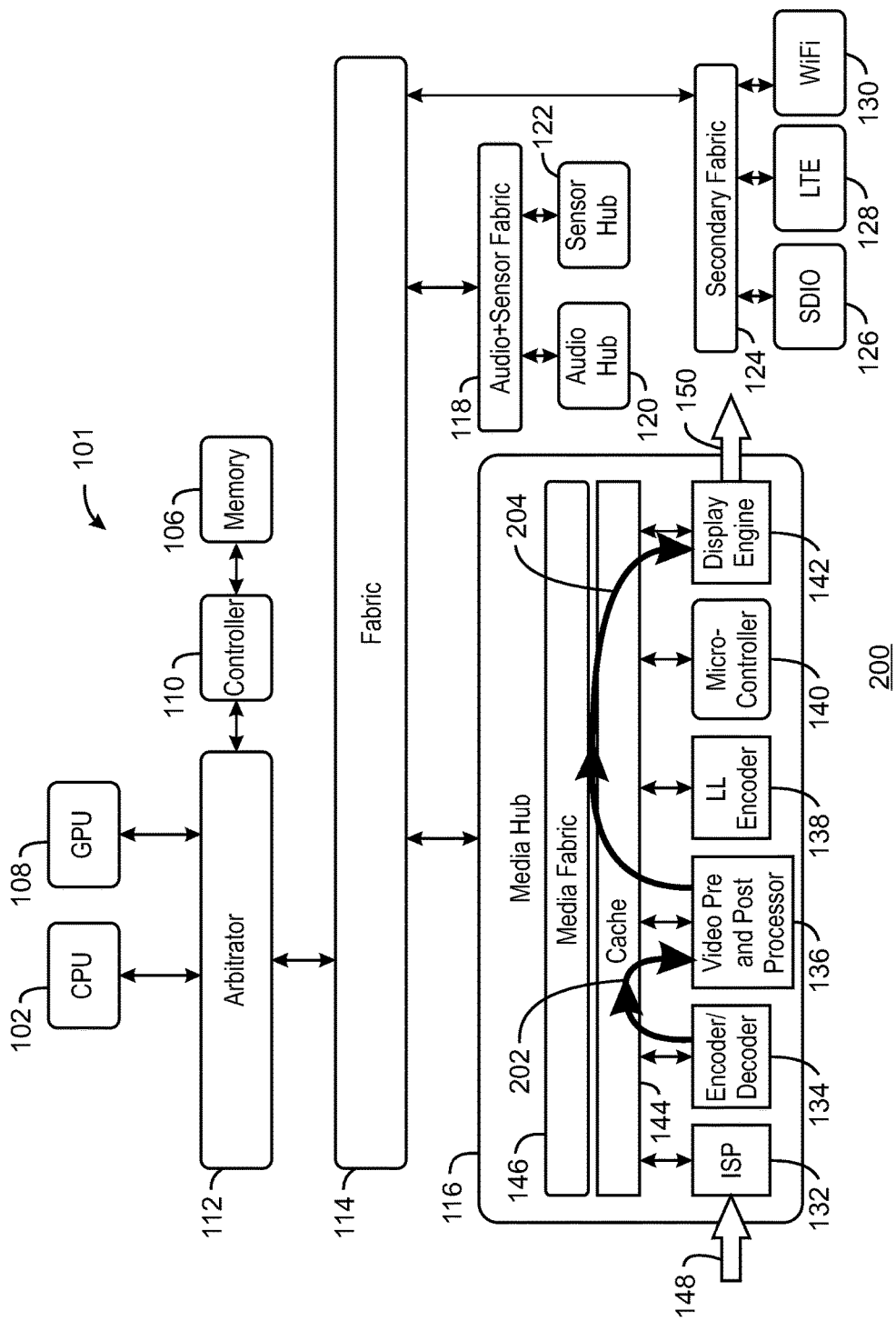
FIG. 2 is a block diagram illustrating the example computing system and video playback using the media hub.

FIG. 2 is a block diagram illustrating the example computing system and video playback using the media hub. One process that may be performed by the computing device 101 of FIG. 1 may include video play back operations, generally indicated at 200. In video play back, components of the media hub 116 including one or more of the media accelerators 134, 136, 140, and 142 of FIG. 1 may perform operations by referencing the ML2 cache 144. Referencing the memory device 106 may be relatively limited in comparison to operations wherein media accelerators access the memory device 106 without the ML2 cache 133, resulting in reduced bandwidth consumption.

As illustrated in FIG. 2, the encoder/decoder 134 may reference frames in the memory device 106, and data may be provided between the encoder/decoder 134 and the video pre and post processor 136 as indicated at 202 via the ML2 cache 144. Once decoded and post processed for display, the video pre and post processor 136 may provide the image data to the display engine 142, as illustrated at 204, for formatting based on a given display (not shown). In other words, instead of directly fetching image data from the memory device 106, the media hub 116 may provide image data via the ML2 cache 144 and the media fabric 146 to various components during video playback during some operations, thereby reducing bandwidth consumption between any given media accelerator, such as media accelerators 134, 136, 140, and 142, and the memory device 106.

Figure 3:
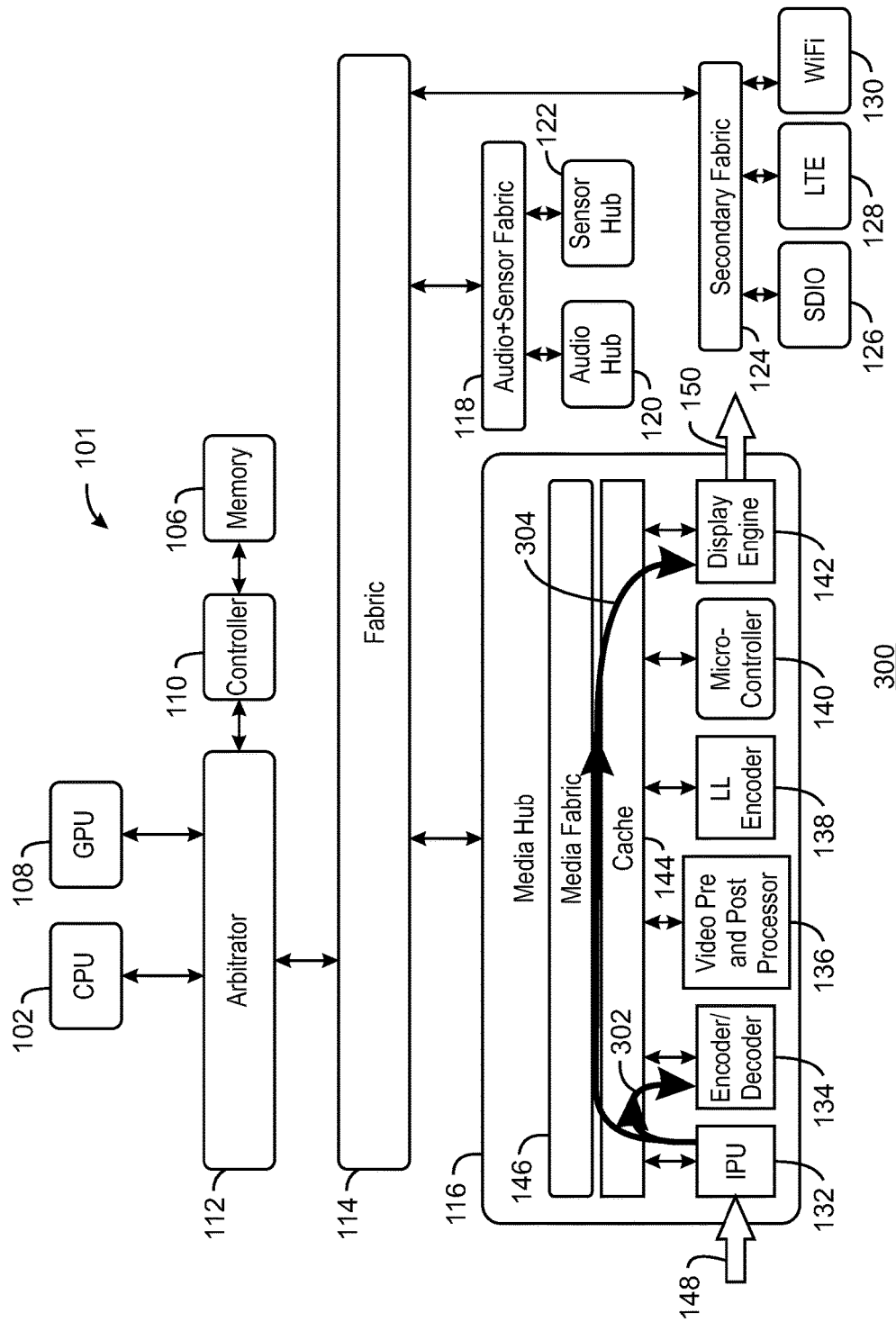
FIG. 3 is a block diagram illustrating the example computing system and video record using the media hub.

FIG. 3 is a block diagram illustrating the example computing system and video record using the media hub. One process that may be performed at the computing device 101 may include video record operations, generally indicated by 300 in FIG. 3. In video record, components of the media hub 116 including one or more of the media accelerators 132, 134, 136, 138, 140, and 142 of FIG. 1 may perform operations by referencing the ML2 cache 144. Referencing the memory device 106 may be relatively limited in comparison to operations wherein media accelerators access the memory device 106 without the ML2 cache 144. The more limited referencing to the memory device 106 may result in reduced bandwidth consumption.

As illustrated in FIG. 3, the ISP 132 may receive video record data from an input/output (I/O) device or interface (not shown). In some cases, the I/O interface may be a Mobile Industry Processor Interface (MIPI) interface configured to provide image data from image capture devices such as camera or other imaging sensor associated with the computing device 300. Video encoding can be performed at the encoder/decoder 134. Rather than routed through the fabric 114, the arbitrator 112, the controller 110, the memory device 106, image data may be provided to the encoder/decoder 134 either directly or by reference to the ML2 cache 144 as it is provide from the ISP 132. In some cases, reference frames associated with encoding at the encoder/decoder 134 may be fetched from the memory device 106. However, in some cases, a current frame or a subsequent frame, and associated data, may be fetched by the encoder/decoder 134 from the ML2 cache 144, as indicated at 302. In either case, the techniques provided herein include a reduction of fetching data, such as reference frames in a video record flow 300, from a memory unit, such as the memory device 106.

As image data is captured and received at the ISP 132, some image data may be provided to the memory device 106. However, in some cases, a path from the ISP 132 to the display engine 142 may be used to provide image data to the display engine 142, as indicated at 304, without reference to the memory device 106. In this way, bandwidth consumption associated with references to the memory device 106 may be reduced.

Further, image date may be provided to the ISP 132 from an I/O of an imaging device (not shown) as discussed above. In this scenario, it may be useful to isolate buffering of the incoming image data from other media accelerators such as one or more of the media accelerators 134, 136, 138, 140, and 142. Therefore, the ML2 cache 144 may function as a buffer for incoming image data, and as a layer of separation between the ISP 132 and one or more other media accelerators 134, 136, 138, 140, and 142 that may be operating at a different frequency that the ISP 132. Similar to separation of the ISP 132 streaming through the ML2 cache 144 from other media accelerators, the display engine 142 may also interact with I/O devices, I/O interfaces, and the like, and may be communicatively coupled to one or more of the media accelerators 132, 134, 136, 138, and 140 via the ML2 cache 144. In other words, media accelerators communicatively coupled to receive from I/O devices and/or output to I/O devices, such as the ISP 132, the display engine 142, and the like, may be communicatively separated by the ML2 cache rather than being more directly communicatively coupled for image data streaming employed between other media accelerators such as one or more of the media accelerators 134, 136, 138, and 140.

Figure 4:
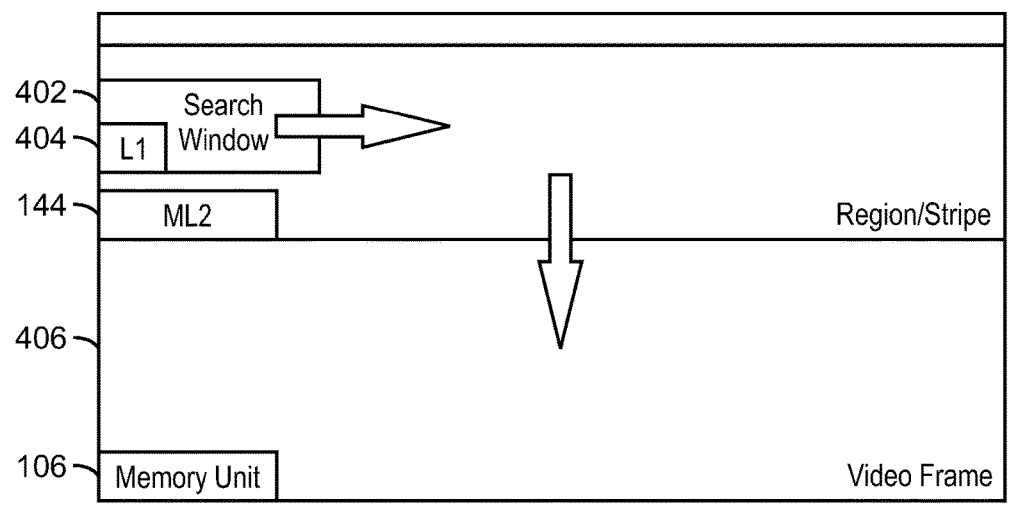
FIG. 4 is a diagram illustrating media processing windows within video frame in accordance with aspects described herein.

FIG. 4 is a diagram illustrating media processing windows within video frame in accordance with aspects described herein. As discussed above in regard to FIG. 1, a first level cache (L1) may be integrated with each of one or more of the media accelerators 132, 134, 136, 138 as indicated by the search window 402. The first level cache 402 may reference a search region or stripe associated with a current frame associated with the ML2 cache 144, as indicated at 404. As the search window 402 proceeds across the region 404 of the ML2 cache 144, references to the memory unit 106 may be fetched as the region 404 moves through a given video frame, as indicated at 406.

In FIG. 4, using the ML2 cache 144 traffic to the memory unit 106 may be reduce, wherein a reference pixel fetch may decrease to 1.2×-1.3× of base frames compared to 2×-5× without reference to a cache local to a media hub, such as the ML2 cache 144. In other words, a 2×-5× reference pixels read per pixel output may be reduced with ML2 cache 144 referencing 1.2× to 1.3× reference pixel reads per pixel output. For example, Table 1 illustrates a reduction in pixel reads per pixel output for a number of synthetic sequences.

TABLE 1

| Sequence | List 0 previous reference frame cached in ML2 (%) | reference pixels reads per pixel output without ML2 | reference pixels reads per pixel output with ML2 |
| --- | --- | --- | --- |
| Tears_of_steel_800p_30fps_9Mbps_200f | 83.40 | 2 to 5 | 1.2 |
| Tennis (lots of occluding regions) | 66.76 | 2 to 5 | 1.3 |
| FinalMaster4k_MSDKTU1_qp10 | 74.21 | 2 to 5 | 1.3 |
| TILES_B_Cisco_1 | 65.07 | 2 to 5 | 1.3 |
| Synthetic sequence | 40 | 2 to 5 | 1.6 |

Bandwidth savings may occur as a result of reduced access to the memory unit 106. Table 2 illustrates estimations of bandwidth savings for media workloads.

TABLE 2

| | | DDR BW (MB/s) | | |
| --- | --- | --- | --- | --- |
| Content Resolution | Post Processing | Current | w/ Media-Hub | DDR BW Reduction (%) |
| Video Playback | | | | |
| 1080p30 | N | 1130 | 503 | 56% |
| 1080p30 | Y | 1679 | 739 | 56% |
| 1080p60 | N | 1397 | 558 | 60% |
| 1080p60 | Y | 2494 | 1148 | 54% |
| 4K30 | N | 2060 | 1445 | 30% |
| 4K30 | Y | 4253 | 2627 | 38% |
| 4K60 | N | 3118 | 1898 | 39% |
| 4K60 | Y | 7505 | 3080 | 59% |
| 8K30 | N | 7052 | 4871 | 31% |
| 8K30 | Y | 18568 | 11580 | 38% |
| Video Record | | | | |
| 4K60 | N | 4546 | 3123 | 31% |
| 4K60 | Y | 8934 | 5012 | 44% |
| Video Playback w/ Widi (Ext display) | | | | |
| 4K60 | Y | 11074 | 4777 | 57% |

Figure 5:
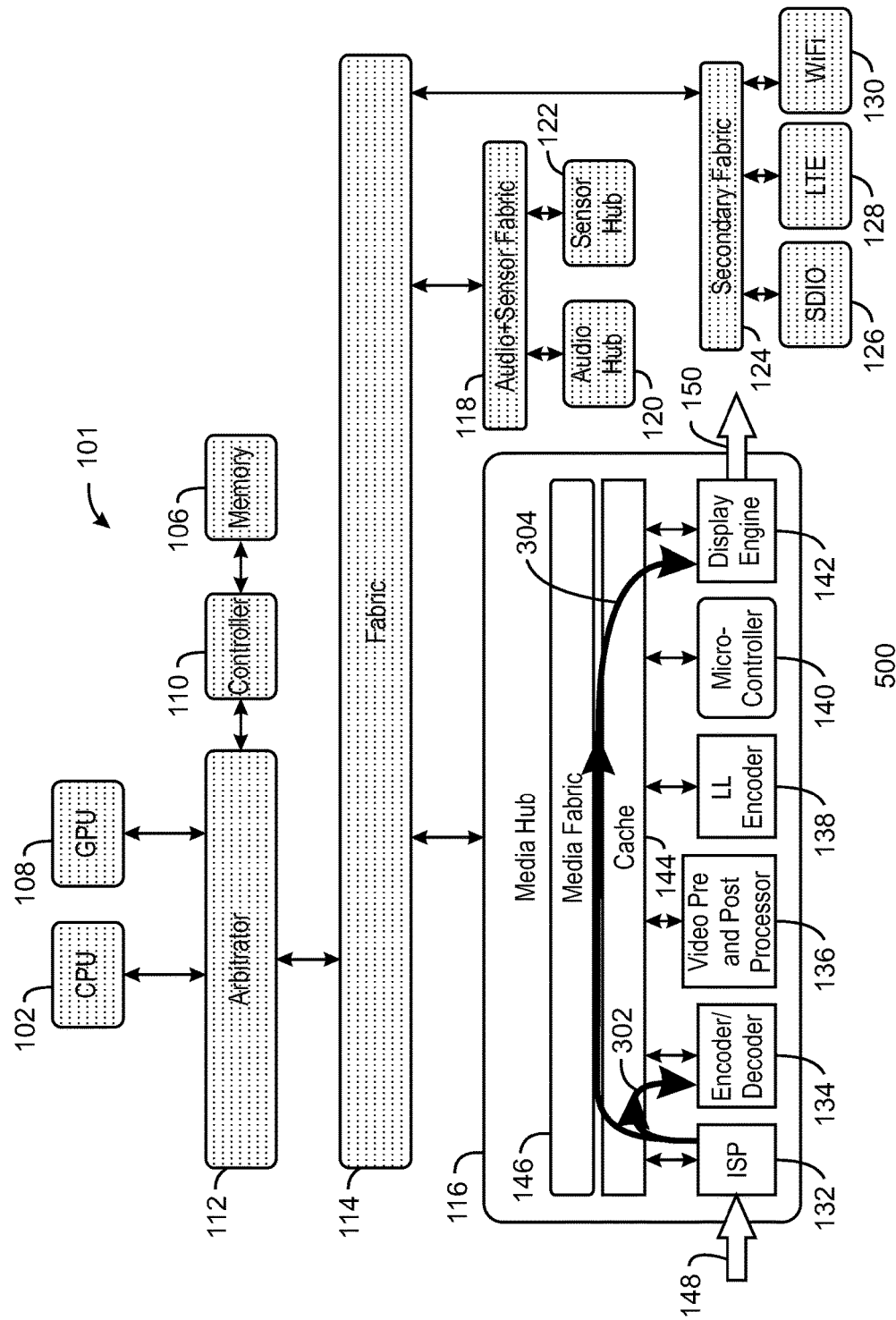
FIG. 5 is a block diagram illustrating the example computing system wherein components of the computing system are in an inactive state during media hub video record operation.

FIG. 5 is a block diagram illustrating the example computing system wherein components of the computing system are in an inactive state during media hub video record operation. As mentioned above, the techniques described herein may reduce power consumption by introducing a power state unique to operations of a media hub having a local cache, such as the media hub 116 having the ML2 cache 144 of FIG. 1.

For example, in FIG. 5, during operations of video record discussed above in regard to FIG. 4, the media hub may remain active, while other components of a computing system may enter a less active state, generally indicated at

500. In FIG. 5, less active components are indicated by shading. For example, during video record, if there is no fetching occurring between the media hub 116 and the memory device 106, the memory device 106, as well as the controller 110 may enter a less active state, as indicated by the shading of memory device 106 and the controller 110. Other components, such as the CPU 102, the GPU 108, the arbitrator 112, the fabric 114, audio hub 120, the sensor hub 122, the secondary fabric 124, the SDIO 126, the LTE module 128, and the like, may enter a less active state than the media hub 116. Further, in some cases, one or more components of the media hub 116 may also enter a less active state.

The presence of ML2 cache 144 and use of streaming between one or more media accelerators 132, 134, 136, 138, 140, and 142 may decrease the data transfers between the fabric 114 and the one or more media accelerators 132, 134, 136, 138, 140, and 142, enabling increased inactivity for rest of the computing system 101. Thereby, an increased switching to a low power state (clock gated for rest of the computing system 101, fabric 114, controller 110 and a deep self-refresh state for the memory device 106. As discussed in more detail below, this lower power state for the computing system 101 may be referred to herein as "S0iM." Although inactive states illustrated in FIG. 5 are indicated during a video record flow similar to the video record operations 300 of FIG. 3, inactive states may accordingly be initiated during other image processing operations, such as the video playback operations 200 of FIG. 2.

In some cases, the computing system 101 can switch between following three states: "S0," "Memory Transfer," and "S0iM." In the "S0" state, the computing system 101 including the media hub 116 may be in an active state. In the "Memory Transfer" state, when data is transferring between the memory device 106 and the ML2 cache 144, components such as the CPU 102 may be in an inactive, "C6," state, while other components such as the media hub 116, the fabric 114, the controller 110, the memory device 106, are in an active state. In the "S0iM" state, the Media Hub 116 may be active while other components, such as the CPU 102, fabric 114, controller 110, the memory 106, are inactive. The S0iM state may be one state of an "S0ix" discussed in more detail below.

In some computing system designs, S0ix entry and exit may be heavily dependent on operating system (OS) drivers implementing correct autonomous power management, and allowing finer granularity power transitions to be implemented by underlying power management micro controllers. In the techniques described herein, when drivers are in a low power state (D0i3), the computing system 101 can enter a deepest possible power state (S0i3). "S0ix" as referred to herein may be a term for low power states for a given platform of SoC in idle. "S0" denotes that the platform is still active, and responsive to user input/activity, and the "x" refers to multiple possible states (S0i1, S0i3, etc.), each with lower power consumption than S0 and correspondingly higher latency to enter and exit each state. In general, S0ix states are achieved when CPU cores, such as cores of the 102 of FIG. 1, are idle and/or in low power state, devices are idle, and OS device drivers have autonomously guided respective hardware into low power state for devices and components associated with a given platform (termed D0i3). In the D0i3, other components such as peripherals, buses, fabrics (such as the fabric 1140), clocks, memory (such as the memory 106), and the like, are also in respective low power states. In such a state, devices can still receive external interrupts (incoming voice call for example, or user activity), and can resume into fully active (S0) state within a few milliseconds. Resuming S0 may occur, in some cases, with no user perceived latency. Hence S0ix entry/exit may require OS guidance, efficient idle window prediction, device driver involvement, and firmware/hardware assistance. Since S0ix states are typically transparent to the rest of the OS and applications, drivers and firmware may coordinate the low power state transitions correctly.

Specifically, low power audio and low power sensing modes (S0ix-audio, S0ix-PSH) may be implemented by allowing the respective components to be "ON," such as audio hub 120, the sensor hub 122, and the like of FIG. 1, while other components of the computing system 101 is in "OFF" or other lower power state. In the techniques described herein, a state, namely SOW, may establish a finer coordination between one or more of the media accelerators 132, 134, 136, 138, 140, and 142, associated driver, and underlying power management controllers (not shown).

For example, a sequence of events to implement the above mentioned low power states may include entering "Memory Transfer" wherein the CPU is in C6, while the media-hub 116, the fabric 114, the controller 110, and the memory device 106 are active. This is the state where data is transferred between the memory device 106 and the ML2 cache 144. Here, the corresponding media accelerators ISP 132 and display engine 142, as well as other media accelerators, may be in an active "D0" state to coordinate the data transfer to and from memory device 106 and the ML2 cache 144.

During the "S0iM" state, in some cases only the media hub 116 is active while other components i.e. CPU 102, the fabric 112, the controller 110, and the memory unit 106, are inactive. Here, device drivers for the GPU 108, and the audio hub 120, sensor hub 122, Wifi 130, LTE 128, SDIO 126, and the like may coordinate to ensure they are all in a D0i3 or idle state.

The S0iM state may be hinted either via an infrastructure driver associated with the CPU 102, or by providing special logic and/or messages between media driver(s), power management unit or software, and power management firmware, and the like to ensure that when drivers associated with components outside of the media hub 116 are in "D0i3," or low power state, and the media hub 116 is still active, the computing system 101 can enter the "S0iM" state with only the media hub kept ON. Other implementation of the coordination between drivers may be OS specific. Similar techniques can be employed for various use-cases e.g. video record, video conferencing, wireless display by configuring Media-Hub policies and cache (ML2) sizes appropriately.

Based on the techniques described above, residence in each of the states described above may be illustrated by Table 3.

TABLE 3

| | | Baseline | | w/ Media-Hub | |
| --- | --- | --- | --- | --- | --- |
| Content | Display | S0 | S0 | Memory Transfer | S0iM |
| 1080p30 | 1080p60 | 100% | 15% | 5% | 80% |
| 4K60 | 1080p60 | 100% | 22% | 10% | 68% |

The optimizations in bandwidth and power management states may result in overall reduction of power consumption, as illustrated below for a few cases in Table 4.

TABLE 4

| Content | Display | Component | Current | w/ Media-Hub | Savings % | Absolute savings (milliwatt) |
|---|---|---|---|---|---|---|
| 1080p30 | 1080p60 | SOC | 332 | 230 | | |
| | | DRAM | 52 | 48 | | |
| | | Total | 384 | 278 | 28% | 106 |
| 4Kp60 | 1080p60 | SOC | 1183 | 751 | | |
| | | DRAM | 126 | 97 | | |
| | | Total | 1309 | 848 | 35% | 461 |

Figure 6:
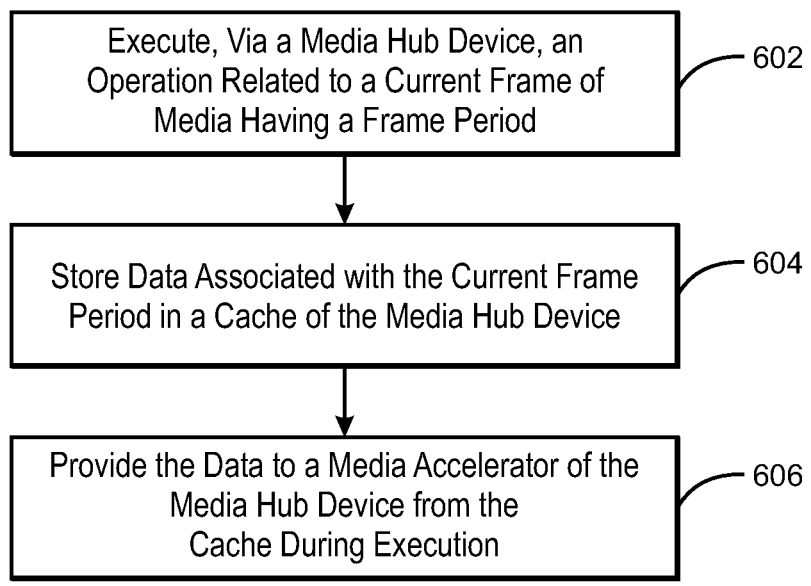
FIG. 6 is a block diagram illustrating a method for providing data to a media accelerator from a local media hub cache.

FIG. 6 is a block diagram illustrating a method for providing data to a media accelerator from a local media hub cache. At block 602, a media hub device may execute an operation related to a current frame of media having a frame period. At block 604, the data associated with the current frame period may be stored in a cache of the media hub device. At 606, the data is provided to a media accelerator of the media hub from the cache during execution.

For example, in a video playback use case, the operation executed at 602 may include referencing frames in a memory unit, such as the memory unit 106 of FIG. 1. Storing at block 604 may include stripe caching in the ML2 cache 144, and providing data at 606 may include providing stripe caching data for decoding at the encoder/decoder 134. Further, the operation 602 may include storing previously processed frames in the memory unit 106, while storing 604 may include stripe caching in the ML2 cache 144, while providing data 606 from the ML2 cache 144 may include providing stripe caching data for video post processing to the video pre and post processor 136. Further, image data may be streamed between the video pre and post processor 136 and the display engine 142.

As another example, in a video record use case the operation executed 602 may include streaming between the ISP 132 and encoder/decoder 134. Reference frames may be stored in the memory unit 106, while storing at block 604 may include stripe caching image data in the encoder/decoder 134. Further, image data may be streamed between the ISP 132 and display engine 142, as discussed above in regard to FIG. 5.

In some cases, the media accelerator is one of a plurality of media accelerators of the media hub device, and further comprising communicatively coupling at least two of the plurality of media accelerators via the cache. Further, the at least two media hub accelerators may be associated with input/output (I/O) communications of the media hub, and wherein the at least two media accelerators are communicatively coupled via a buffer of the cache. The media accelerator may be one of a plurality of media accelerators of the media hub device. In this scenario, the method 600 may further include communicatively coupling at least two of the plurality of media accelerators via a channel aside from the cache.

In some cases, the media hub device is a component of computing system. In this scenario, the method 600 may include entering one or more other components of the computing system into an idle state during execution of the current frame by the media accelerator by an indication from the media hub to a power management unit of the computing system.

The one or more other components of the computing system may include a central processing unit, a graphical processing unit, a memory component accessible by the central processing unit or the graphical processing unit, or any combination thereof. In some cases, the method 600 may include reducing bandwidth consumption by reducing access of the media accelerator to a memory component of the computing system that would otherwise occur if the data was not present in the cache of the media hub device. The method 600 may also include configuring a size of the cache based on a media-specific application.

In some cases, the cache is a level two cache. The computing system may include a level one cache wherein at least a portion of the level one cache is integrated within the media accelerator. In this scenario, providing the data to the media accelerator from the cache during execution may include referencing the level two cache comprising a region of the current frame, and referencing the level one cache comprising a search window that is a subset of the region.

Example Section

The following example section is illustrative of various combinations of the techniques described herein. Any combination of the following examples is contemplated.

Example 1 is a media hub device. The wireless charging device may include a media accelerator configured to execute an operation on a current frame of media having a frame period, and a cache of the media hub device to provide, to the media accelerator, data associated with the frame period of the current frame.

Example 2 includes the media hub device of example 1. The media accelerator is one of a multitude of media accelerators of the media hub device, and wherein at least two of the multitude of media accelerators are communicatively coupled via the cache.

Example 3 includes the media hub device of any combination of examples 1-2. The at least two media hub accelerators are associated with input/output (I/O) communications of the media hub, and wherein the at least two media accelerators are communicatively coupled via a buffer of the cache.

Example 4 includes the media hub device of any combination of examples 1-3. The media accelerator is one of a multitude of media accelerators of the media hub device, and wherein at least two of the multitude of media accelerators are communicatively coupled via a channel aside from the cache.

Example 5 includes the media hub device of any combination of examples 1-4. The media hub device is a component of computing system, and wherein one or more other components of the computing system is entered into an idle state during execution of the current frame by the media accelerator of the media hub by an indication from the media hub to a power management unit of the computing system.

Example 6 includes the media hub device of any combination of examples 1-5. The media hub device is configured to reduce bandwidth consumption associated with access of the media accelerator to a memory component of the computing system that would otherwise occur if the data was not present in the cache of the media hub device.

Example 7 includes the media hub device of any combination of examples 1-6. The media accelerator may include a component associated with media processing and is not integrated within components comprising: a central processing unit, a graphical processing unit, or any combination thereof.

Example 8 includes the media hub device of any combination of examples 1-7. In this example a size of the cache is based on a media-specific application.

Example 9 includes the media hub device of any combination of examples 1-8. The cache is a level two cache. This example includes a level one cache wherein at least a portion of the level one cache is integrated within the media accelerator.

Example 10 includes the media hub device of any combination of examples 1-9. The level two cache may include a region of the current frame, and wherein the level one cache may include a search window that is a subset of the region.

Example 11 is a method. The wireless charging device may include executing, via a media hub device, an operation related to a current frame of media having a frame period, storing data associated with the current frame period in a cache of the media hub device, and providing the data to a media accelerator of the media hub device from the cache during execution.

Example 12 includes the method of example 11. The media accelerator is one of a multitude of media accelerators of the media hub device, and further comprising communicatively coupling at least two of the multitude of media accelerators via the cache.

Example 13 includes the method of any combination of examples 11-12. The at least two media hub accelerators are associated with input/output (I/O) communications of the media hub, and wherein the at least two media accelerators are communicatively coupled via a buffer of the cache.

Example 14 includes the method of any combination of examples 11-13. The media accelerator is one of a multitude of media accelerators of the media hub device. This example includes communicatively coupling at least two of the multitude of media accelerators via a channel aside from the cache.

Example 15 includes the method of any combination of examples 11-14. The media hub device is a component of computing system. This example includes entering one or more other components of the computing system into an idle state during execution of the current frame by the media accelerator by an indication from the media hub to a power management unit of the computing system.

Example 16 includes the method of any combination of examples 11-15. The one or more other components of the computing system may include a central processing unit, a graphical processing unit, a memory component accessible by the central processing unit or the graphical processing unit, or any combination thereof.

Example 17 includes the method of any combination of examples 11-16. This example includes reducing bandwidth consumption by reducing access of the media accelerator to a memory component of the computing system that would otherwise occur if the data was not present in the cache of the media hub device.

Example 18 includes the method of any combination of examples 11-17. This example includes configuring a size of the cache based on a media-specific application.

Example 19 includes the method of any combination of examples 11-18. The cache is a level two cache. This example includes a level one cache wherein at least a portion of the level one cache is integrated within the media accelerator.

Example 20 includes the method of any combination of examples 11-19. In this example providing the data to the media accelerator from the cache during execution may include referencing the level two cache comprising a region of the current frame, and referencing the level one cache comprising a search window that is a subset of the region.

Example 21 is a system. The wireless charging device may include a media hub device to execute an operation on a current frame of media having a frame period, and a cache of the media means to provide, to a media accelerator of the media means, data associated with the frame period of the current frame, and a memory component to provide data to the cache for frame periods subsequent to the current frame.

Example 22 includes the system of example 21. The media accelerator is one of a multitude of media accelerators of the media hub device, and wherein at least two of the multitude of media accelerators are communicatively coupled via the cache.

Example 23 includes the system of any combination of examples 21-22. In this example at least two of the multitude media hub accelerators are associated with input/output (I/O) communications of the media hub device, and wherein the at least two media accelerators are communicatively coupled via a buffer of the cache.

Example 24 includes the system of any combination of examples 21-23. The media accelerator is one of a multitude of media accelerators of the media hub device, and wherein at least two of the multitude of media accelerators are communicatively coupled via a channel aside from the cache.

Example 25 includes the system of any combination of examples 21-24. The media hub device is a component of computing system, and wherein one or more other components of the computing system is entered into an idle state during execution of the current frame by the media accelerator of the media hub by an indication from the media hub to a power management unit of the computing system.

Example 26 includes the system of any combination of examples 21-25. The media hub is configured to reduce bandwidth consumption associated with access of the media accelerator to the memory component of the computing system that would otherwise occur if the data was not present in the cache of the media hub device.

Example 27 includes the system of any combination of examples 21-26. The media accelerator may include a component associated with media processing and is not integrated within components comprising: a central processing unit, a graphical processing unit, or any combination thereof.

Example 28 includes the system of any combination of examples 21-27. In this example a size of the cache is based on a media-specific application.

Example 29 includes the system of any combination of examples 21-28. The cache is a level two cache. This example includes a level one cache wherein at least a portion of the level one cache is integrated within the media accelerator.

Example 30 includes the system of any combination of examples 21-29. The level two cache may include a region of the current frame, and wherein the level one cache may include a search window that is a subset of the region.

Example 31 is a method. The wireless charging device may include executing, via a media hub means, an operation related to a current frame of media having a frame period, storing data associated with the current frame period in a cache of the media hub means, and providing the data to a media accelerator of the media hub means from the cache during execution.

Example 32 includes the method of example 31. The media accelerator is one of a multitude of media accelerators of the media hub means, and further comprising communicatively coupling at least two of the multitude of media accelerators via the cache.

Example 33 includes the method of any combination of examples 31-32. The at least two media hub accelerators are associated with input/output (I/O) communications of the media hub, and wherein the at least two media accelerators are communicatively coupled via a buffer of the cache.

Example 34 includes the method of any combination of examples 31-33. The media accelerator is one of a multitude of media accelerators of the media hub means. This example includes communicatively coupling at least two of the multitude of media accelerators via a channel aside from the cache.

Example 35 includes the method of any combination of examples 31-34. The media hub means is a component of computing system. This example includes entering one or more other components of the computing system into an idle state during execution of the current frame by the media accelerator by an indication from the media hub to a power management unit of the computing system.

Example 36 includes the method of any combination of examples 31-35. The one or more other components of the computing system may include a central processing unit, a graphical processing unit, a memory component accessible by the central processing unit or the graphical processing unit, or any combination thereof.

Example 37 includes the method of any combination of examples 31-36. This example includes reducing bandwidth consumption by reducing access of the media accelerator to a memory component of the computing system that would otherwise occur if the data was not present in the cache of the media hub means.

Example 38 includes the method of any combination of examples 31-37. This example includes configuring a size of the cache based on a media-specific application.

Example 39 includes the method of any combination of examples 31-38. The cache is a level two cache. This example includes a level one cache wherein at least a portion of the level one cache is integrated within the media accelerator.

Example 40 includes the method of any combination of examples 31-39. In this example providing the data to the media accelerator from the cache during execution may include referencing the level two cache comprising a region of the current frame, and referencing the level one cache comprising a search window that is a subset of the region.

Example 41 is a system. The wireless charging device may include a media hub means to execute an operation on a current frame of media having a frame period, and a cache of the media hub means to provide, to a media accelerator of the media means, data associated with the frame period of the current frame, and a memory component to provide data to the cache for frame periods subsequent to the current frame.

Example 42 includes the system of example 41. The media accelerator is one of a multitude of media accelerators of the media hub means, and wherein at least two of the multitude of media accelerators are communicatively coupled via the cache.

Example 43 includes the system of any combination of examples 41-42. In this example at least two of the multitude media hub accelerators are associated with input/output (I/O) communications of the media hub, and wherein the at least two media accelerators are communicatively coupled via a buffer of the cache.

Example 44 includes the system of any combination of examples 41-43. The media accelerator is one of a multitude of media accelerators of the media hub means, and wherein at least two of the multitude of media accelerators are communicatively coupled via a channel aside from the cache.

Example 45 includes the system of any combination of examples 41-44. The media hub means is a component of computing system, and wherein one or more other components of the computing system is entered into an idle state during execution of the current frame by the media accelerator of the media hub by an indication from the media hub to a power management unit of the computing system.

Example 46 includes the system of any combination of examples 41-45. The media hub is configured to reduce bandwidth consumption associated with access of the media accelerator to the memory component of the computing system that would otherwise occur if the data was not present in the cache of the media hub means.

Example 47 includes the system of any combination of examples 41-46. The media accelerator may include a component associated with media processing and is not integrated within components comprising: a central processing unit, a graphical processing unit, or any combination thereof.

Example 48 includes the system of any combination of examples 41-47. In this example a size of the cache is based on a media-specific application.

Example 49 includes the system of any combination of examples 41-48. The cache is a level two cache. This example includes a level one cache wherein at least a portion of the level one cache is integrated within the media accelerator.

Example 50 includes the system of any combination of examples 41-49. The level two cache may include a region of the current frame, and wherein the level one cache may include a search window that is a subset of the region.

Examples may include subject matter such as a method, means for performing acts of the method, at least one machine-readable medium including instructions that, when performed by a machine cause the machine to performs acts of the method. It is to be understood that specifics in the aforementioned examples may be used anywhere in one or more embodiments. For instance, all optional features of the computing device described above may also be implemented with respect to either of the methods described herein or a computer-readable medium. Furthermore, although flow diagrams and/or state diagrams may have been used herein to describe embodiments, the present techniques are not limited to those diagrams or to corresponding descriptions herein. For example, flow need not move through each illustrated box or state or in exactly the same order as illustrated and described herein.

Although some embodiments have been described in reference to particular implementations, other implementations are possible according to some embodiments. Additionally, the arrangement and order of circuit elements or other features illustrated in the drawings or described herein

What is claimed is:

1. A system comprising:
   a main memory;
   a memory controller to process memory access requests to the main memory;
   a media hub device comprising a media accelerator configured to execute an operation on a current frame of media having a frame period and received from the main memory through a main fabric;
   a cache of the media hub device to provide, to the media accelerator, data associated with the frame period of the current frame; and
   an arbitrator to communicatively couple the main fabric to the main memory and to communicatively couple a Central Processing Unit (CPU) to the main memory, wherein the arbitrator is to arbitrate accesses to the main memory by the media accelerator and the CPU;
   wherein the media accelerator is one of a plurality of media accelerators of the media hub device, and wherein the plurality of media accelerators are communicatively coupled to one another through the cache and a media hub fabric separate from the main fabric.

2. The system of claim 1, wherein the at least two media accelerators are associated with input/output (I/O) communications of the media hub device, and wherein the at least two media accelerators are communicatively coupled via a buffer of the cache.

3. The system of claim 1, wherein at least two of the plurality of media accelerators are communicatively coupled via a channel aside from the cache.

4. The system of claim 1, wherein the media hub device is a component of computing system, and wherein one or more other components of the computing system is entered into an idle state during execution of the current frame by the media accelerator of the media hub by an indication from the media hub to a power management unit of the computing system.

5. The system of claim 4, wherein the media hub device is configured to reduce bandwidth consumption associated with access of the media accelerator to a memory component of the computing system that would otherwise occur if the data was not present in the cache of the media hub device.

6. The system of claim 1, wherein the media accelerator comprises a component associated with media processing and is not integrated within components comprising:
   a central processing unit;
   a graphical processing unit; or
   any combination thereof.

7. The system of claim 1, wherein a size of the cache is based on a media-specific application.

8. The system of claim 1, wherein the cache is a level two cache, further comprising a level one cache wherein at least a portion of the level one cache is integrated within the media accelerator.

9. The system of claim 8, wherein the level two cache comprises a region of the current frame, and wherein the level one cache comprises a search window that is a subset of the region.

10. A method, comprising:
    receiving, at a media hub device, a current frame of media having a frame period from a main memory through a main fabric, wherein access to the current frame is controlled by an arbitrator that communicatively couples the main fabric to the main memory and communicatively couples a Central Processing Unit (CPU) to the main memory, wherein the arbitrator is to arbitrate accesses to the main memory by the media accelerator and the CPU;
    executing, via the media hub device, an operation related to the current frame of media;
    storing data associated with the current frame period in a cache of the media hub device; and
    providing the data to a media accelerator of the media hub device from the cache during execution, wherein providing the data to the media accelerator comprises transferring the data through a media hub fabric separate from the main fabric without accessing the memory component.

11. The method of claim 10, wherein the media accelerator is one of a plurality of media accelerators of the media hub device, further comprising communicatively coupling at least two of the plurality of media accelerators via the cache.

12. The method of claim 11, wherein the at least two media hub accelerators are associated with input/output (I/O) communications of the media hub device, and wherein the at least two media accelerators are communicatively coupled via a buffer of the cache.

13. The method of claim 10, wherein the media hub device is a component of a computing system, the method further comprising entering one or more other components of the computing system into an idle state during execution of the current frame by the media accelerator by an indication from the media hub device to a power management unit of the computing system.

14. The method of claim 13, wherein the one or more other components of the computing system comprise:
a central processing unit;
a graphical processing unit; or
any combination thereof.

15. The method of claim 13, further comprising reducing bandwidth consumption by reducing access of the media accelerator to the memory component of the computing system that would otherwise occur if the data was not present in the cache of the media hub device.

16. The method of claim 10, further comprising configuring a size of the cache based on a media-specific application.

17. The method of claim 10, wherein the cache is a level two cache, further comprising a level one cache wherein at least a portion of the level one cache is integrated within the media accelerator.

18. The method of claim 17, wherein providing the data to the media accelerator from the cache during execution comprises:
referencing the level two cache comprising a region of the current frame, and
referencing the level one cache comprising a search window that is a subset of the region.

19. A system, comprising:
a media hub device configured to execute an operation on a current frame of media having a frame period; and
a cache of the media hub device to provide, to a media accelerator of the media hub device through a media hub fabric, data associated with the frame period of the current frame;
a memory component to provide data to the cache through a main fabric separate from the media hub fabric for frame periods subsequent to the current frame; and
an arbitrator to communicatively couple the main fabric to the memory component and to communicatively couple a Central Processing Unit (CPU) to the memory component, wherein the arbitrator is to arbitrate accesses to the memory component by the media accelerator and the CPU.

20. The system of claim 19, wherein the media accelerator is one of a plurality of media accelerators of the media hub device, and wherein at least two of the plurality accelerators are associated with input/output (I/O) communications of the media hub device, and wherein the at least two media accelerators are communicatively coupled via a buffer of the cache.

21. The system of claim 19, wherein the system is a computing system, further comprising one or more other components, and wherein one or more of the components is entered into an idle state during execution of the current frame by the media accelerator of the media hub device.

22. The system of claim 19 wherein the media hub is configured to reduce access of the media accelerator to the memory component that would otherwise occur if the data was not present in the cache of the media hub device.

23. The system of claim 19, wherein the cache is a level two cache, further comprising a level one cache wherein at least a portion of the level one cache is integrated within the media accelerator, wherein the level two cache comprises a region of the current frame, and wherein the level one cache comprises a search window that is a subset of the region.

* * * * *